United States Patent
Bergner et al.

(10) Patent No.: US 9,076,191 B2
(45) Date of Patent: Jul. 7, 2015

(54) AUTOMATIC DETERMINATION OF REGULARIZATION FACTOR FOR ITERATIVE IMAGE RECONSTRUCTION WITH REGULARIZATION AND/OR IMAGE DE-NOISING

(71) Applicant: KONINKLIJKE PHILIPS N.V., Eindhoven (NL)

(72) Inventors: Frank Bergner, Hamburg (DE); Bernhard Johannes Brendel, Hamburg (DE); Thomas Koehler, Norderstedt (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/364,715

(22) PCT Filed: Dec. 4, 2012

(86) PCT No.: PCT/IB2012/056929
§ 371 (c)(1),
(2) Date: Jun. 12, 2014

(87) PCT Pub. No.: WO2013/088294
PCT Pub. Date: Jun. 20, 2013

(65) Prior Publication Data
US 2014/0348440 A1    Nov. 27, 2014

Related U.S. Application Data

(60) Provisional application No. 61/569,835, filed on Dec. 13, 2011.

(51) Int. Cl.
*G06T 5/00* (2006.01)
*G06T 11/00* (2006.01)

(52) U.S. Cl.
CPC ............... *G06T 5/00* (2013.01); *G06T 11/006* (2013.01); *G06T 2211/424* (2013.01); *G06T 2207/20004* (2013.01)

(58) Field of Classification Search
CPC ............ G06T 2211/424; G06T 11/005; G06T 2211/412; G06T 11/003; G06T 2207/20004; G06T 2211/436; G06T 5/00; G06T 5/002; G06T 7/0044; A61B 6/032; A61B 6/037; A61B 5/055; G01N 2223/419; G01N 23/046
See application file for complete search history.

(56) References Cited

U.S. PATENT DOCUMENTS 7,864,999 B2    1/2011    Chang et al.
7,885,371 B2    2/2011    Thibault et al.
(Continued)

FOREIGN PATENT DOCUMENTS

WO    2012056364 A1    5/2012

OTHER PUBLICATIONS

Lingjun et al: "Adaptive Regularized Map of CT Image Reconstruction Method; Computer Engineering and Applications"; vol. 47, No. 28, Oct. 2011, pp. 198-200.

(Continued)

*Primary Examiner* — Jingge Wu

(57) ABSTRACT

A processing component (122) processes images based on an iterative reconstruction algorithm with regularization and/or de-noising algorithm. The processing component includes a set point determiner (224) that determines a quality set point (216) between predetermined lower and upper quality bounds (226) based on a quality variable (228) indicative of an image quality of interest. The processing component further includes a comparator (214) that compares, each processing iteration, a quality metric of a current generated image with the quality set point and generates a difference value indicative of a difference between the quality metric and the quality set point. The processing component further includes a regularization factor updater (220) that generates an updated regularization factor for a next processing iteration based on a current value (222) of the regularization factor and at least the quality metric in response to the difference value indicating that the quality metric is outside of a predetermined range about the quality set point.

20 Claims, 5 Drawing Sheets

(56) References Cited

U.S. PATENT DOCUMENTS

Figure 1:
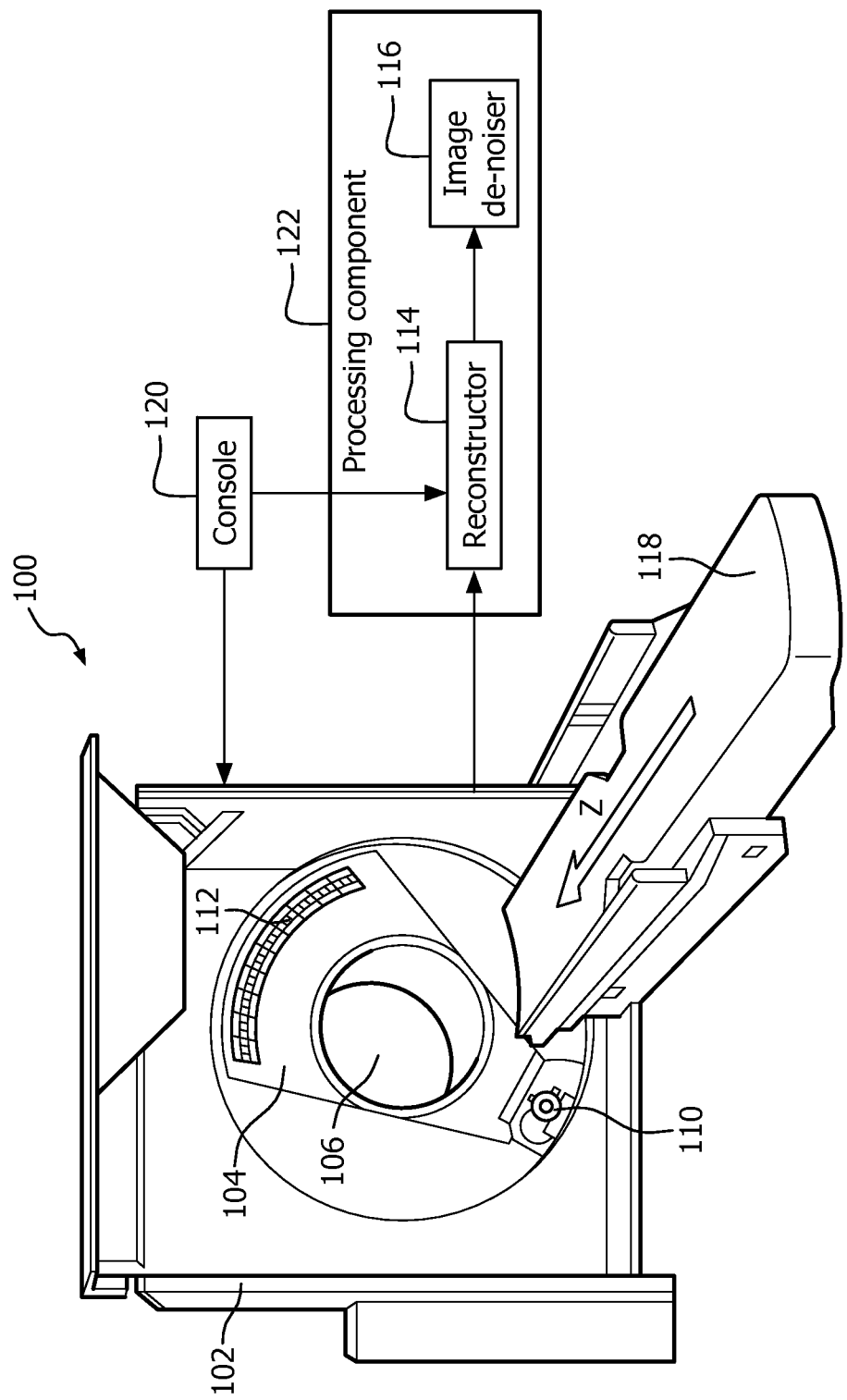

| | | | |
|---|---|---|---|
| 2008/0063247 A1* | 3/2008 | Griswold | 382/128 |
| 2008/0292135 A1* | 11/2008 | Schafer et al. | 382/100 |
| 2008/0304726 A1* | 12/2008 | Fessler et al. | 382/131 |
| 2009/0161932 A1 | 6/2009 | Chen | |
| 2010/0005130 A1* | 1/2010 | Oktem et al. | 708/446 |
| 2010/0246917 A1 | 9/2010 | Bruder et al. | |
| 2011/0156704 A1* | 6/2011 | Boernert et al. | 324/309 |
| 2011/0293158 A1 | 12/2011 | Popescu | |
| 2013/0108010 A1* | 5/2013 | Markkanen et al. | 378/19 |
| 2013/0259343 A1* | 10/2013 | Liu et al. | 382/131 |
| 2014/0003688 A1* | 1/2014 | Hansis | 382/130 |

OTHER PUBLICATIONS

Jerebko et al: "Regularization Parameter Selection in Maximum a Posteriori Iterative Reconstruction for Digital Breast Tomosynthesis"; Mammography: 10th Internal Workshop, IWDM 2010, LNCS 6136, pp. 548-555.

Liao et al: "Selection of Regularization Parameter in Total Variation Image Restoration", Journal of the Optical Society of America, vol. 26, No. 11, Nov. 2009, pp. 2311-2320.

Fessler: "Statistical Image Reconstruction Methods for Transmission Tomography"; Handbook of Medical Imaging, vol. 2: Medical Image Processing and Analysis, SPIE, Bellingham, 2000. Chapter 1, pp. 1-70.

\* cited by examiner

AUTOMATIC DETERMINATION OF REGULARIZATION FACTOR FOR ITERATIVE IMAGE RECONSTRUCTION WITH REGULARIZATION AND/OR IMAGE DE-NOISING

CROSS-REFERENCE TO PRIOR APPLICATIONS

This application is the U.S. National Phase application under 35 U.S.C. §371 of International Application No. PCT/IB2012/056929, filed on Dec. 4, 2012, which claims the benefit of U.S. Provisional Patent Application No. 61/569,835, filed on Dec. 13, 2011. These applications are hereby incorporated by reference herein.

The following generally relates to iterative image reconstruction with regularization and/or image de-noising and finds particular application to computed tomography (CT), and is also amenable to other imaging modalities.

A CT scanner includes an x-ray tube mounted on a rotatable gantry that rotates around an examination region about a z-axis. A detector array subtends an angular arc opposite the examination region from the x-ray tube. The x-ray tube emits radiation that traverses the examination region. The detector array detects radiation that traverses the examination region and generates projection data indicative thereof. A reconstructor reconstructs, using an iterative or non-iterative reconstruction algorithm, the projection data, generating images indicative of the examination region. The noise level of the images depends on various imaging parameters and can be reduced through de-noising algorithms.

Iterative image reconstruction with regularization and/or image de-noising algorithms have been formulated through a cost function with a data fidelity term and a regularization term. The latter term is multiplied by a regularization factor $\beta$, and then both terms are added to determine a total cost, which is minimized. A generic cost function can be expressed as: $\text{Cost}(f) = F(f) + \beta \cdot R(f)$, where f represents an image, F(f) represents the data fidelity term, R(f) represents the regularization term, and $\beta$ is a free parameter and represents the regularization factor that controls the strength of the regularization. For iterative reconstruction with regularization, the data fidelity term compares the forward projected image with the measured projections, optionally including a noise model on the projection. For de-noising, the data fidelity term can be the difference with the initial, noisy image. Likewise, a noise model can be included.

Generally, the regularization factor $\beta$ is manually determined. However, $\beta$ tends to be image and dataset dependent. Therefore, $\beta$ has to be manually determined for each different image and/or dataset. This has been achieved by running several iterations with different $\beta$'s (in parallel or series) and selecting the $\beta$ that satisfies predetermined criteria. Unfortunately, this process can be computational and time intensive. For example, given a typical iteration takes two (2) to three (3) hours and ten (10) or more iterations may be ran before reaching a desirable final image, determining $\beta$ for a particular image may take twenty (20) or more hours.

Aspects described herein address the above-referenced problems and others.

In one aspect, a processing component processes images based on an iterative reconstruction algorithm with regularization and/or de-noising algorithm. The processing component includes a set point determiner that determines a quality set point between predetermined lower and upper quality bounds based on a quality variable indicative of an image quality of interest. The processing component further includes a comparator that compares, each processing iteration, a quality metric of a current generated image with the quality set point and generates a difference value indicative of a difference between the quality metric and the quality set point. The processing component further includes a regularization factor updater that generates an updated regularization factor for a next processing iteration based on a current value of the regularization factor and at least the quality metric in response to the difference value indicating that the quality metric is outside of a predetermined range about the quality set point.

In another aspect, a method includes processing an initial image during a first processing iteration using an algorithm, which employs regularization, and an initial regularization factor, and generating a first image. The method further includes determining a first quality metric of the first image. The method further includes comparing the first quality metric of the first image with a quality set point and determining a difference value there between. The method further includes generating an updated regularization factor for a subsequent processing iteration of the image in response to the first quality metric being outside of a predetermined range about the quality set point. The updated regularization factor is generated based on the initial regularization factor and the first quality metric, and the updated regularization factor is used to process the first image during the subsequent processing iteration and generate a subsequent image.

In another aspect, a processing component includes a component that processes an image using an iterative algorithm employing regularization and generates an image, wherein the iterative algorithm at least includes a regularization term multiplied by a regularization factor. The processing component further includes an analyzer that generates a quality metric after each processing iteration for a respective generated image. The processing component further includes a regularization factor determiner that automatically generates an updated regularization factor for a next processing iteration by the component based on a quality metric of a generated image of a current processing iteration and a predetermined quality set point for the generated image.

The invention may take form in various components and arrangements of components, and in various steps and arrangements of steps. The drawings are only for purposes of illustrating the preferred embodiments and are not to be construed as limiting the invention.

FIG. 1 schematically illustrates an example imaging system.

Figure 2:
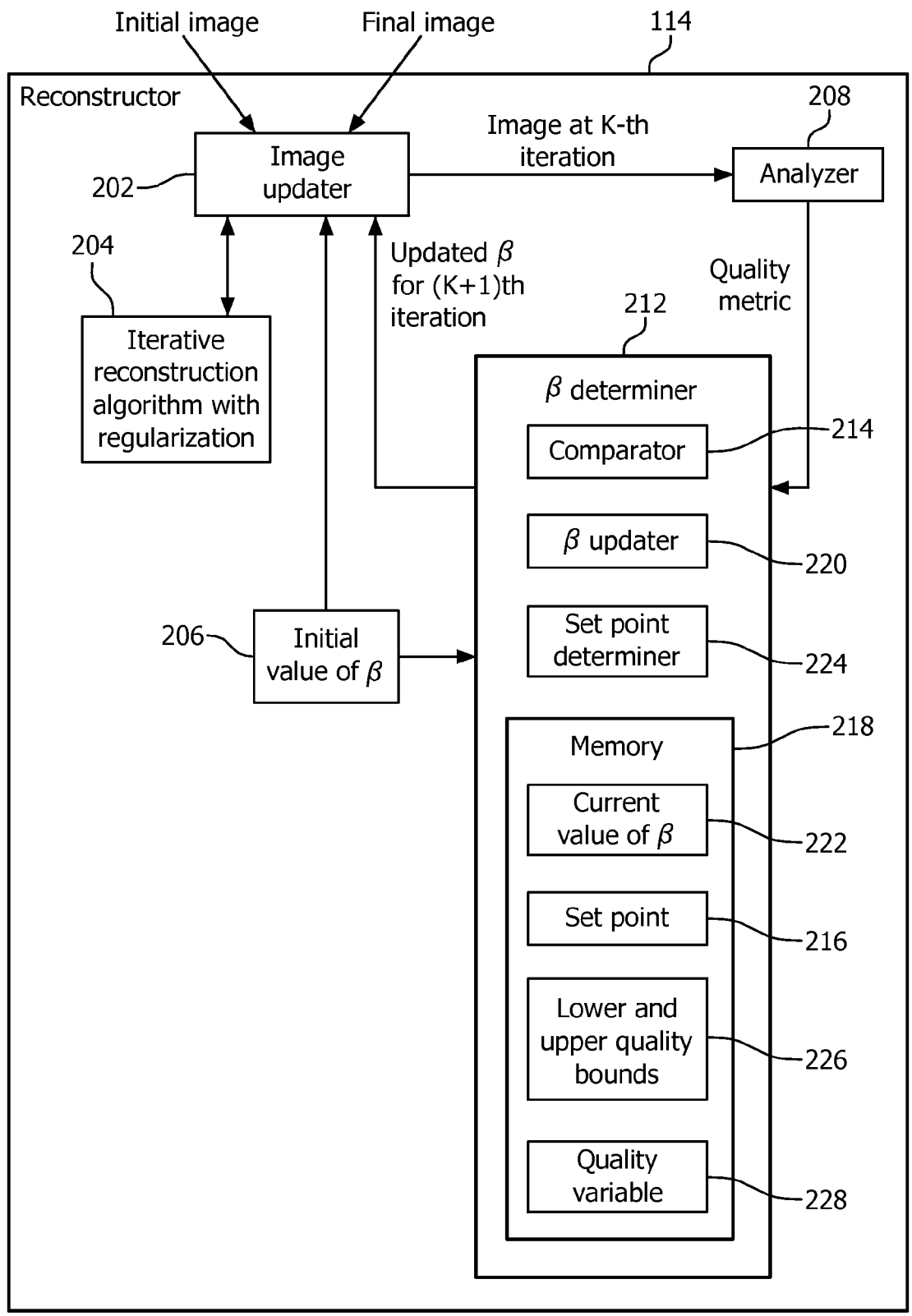

FIG. 2 schematically illustrates an example reconstructor that can be utilized with the imaging system of FIG. 1.

Figure 3:
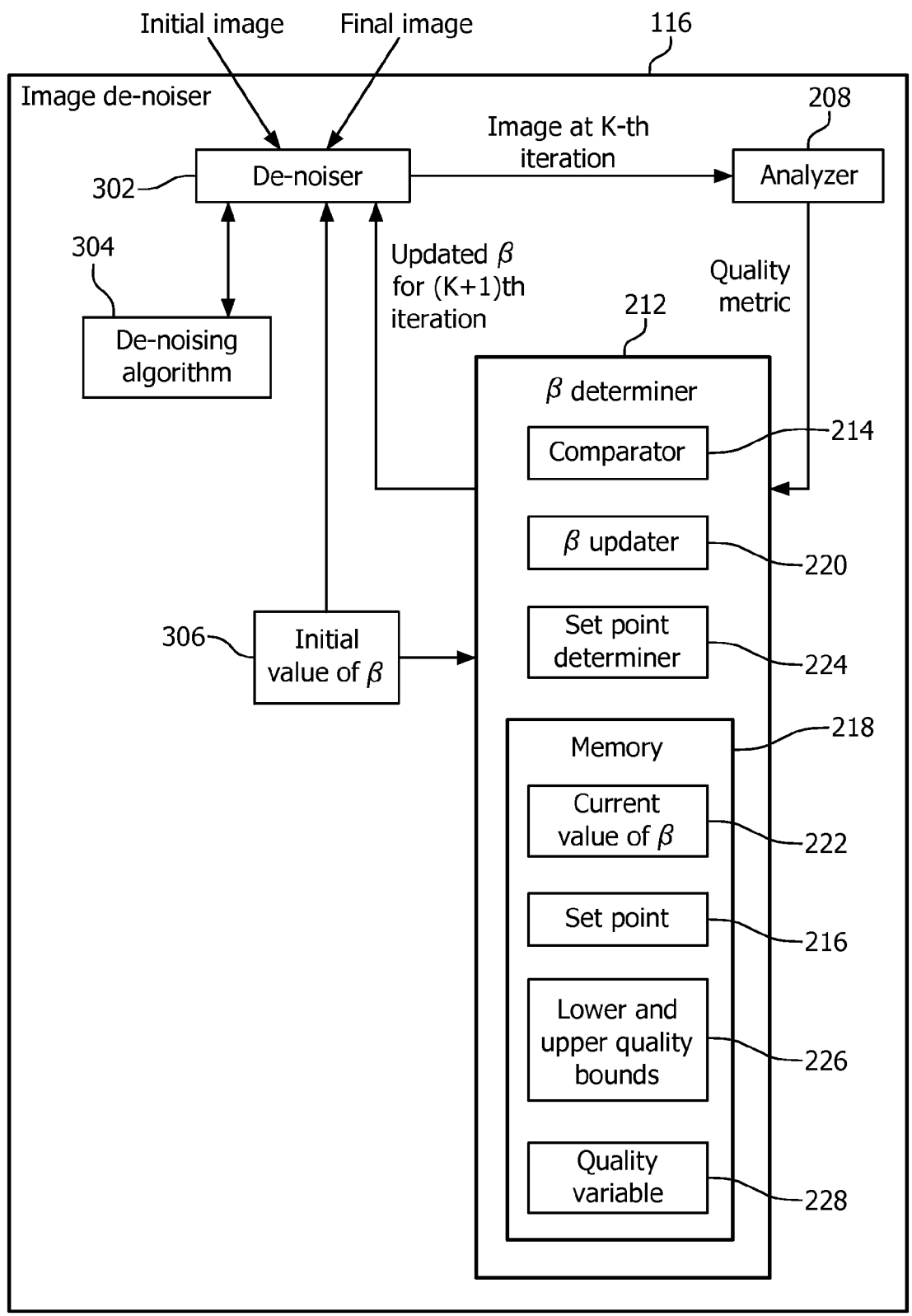

FIG. 3 schematically illustrates an example image de-noiser that can be utilized with the imaging system of FIG. 1.

Figure 4:
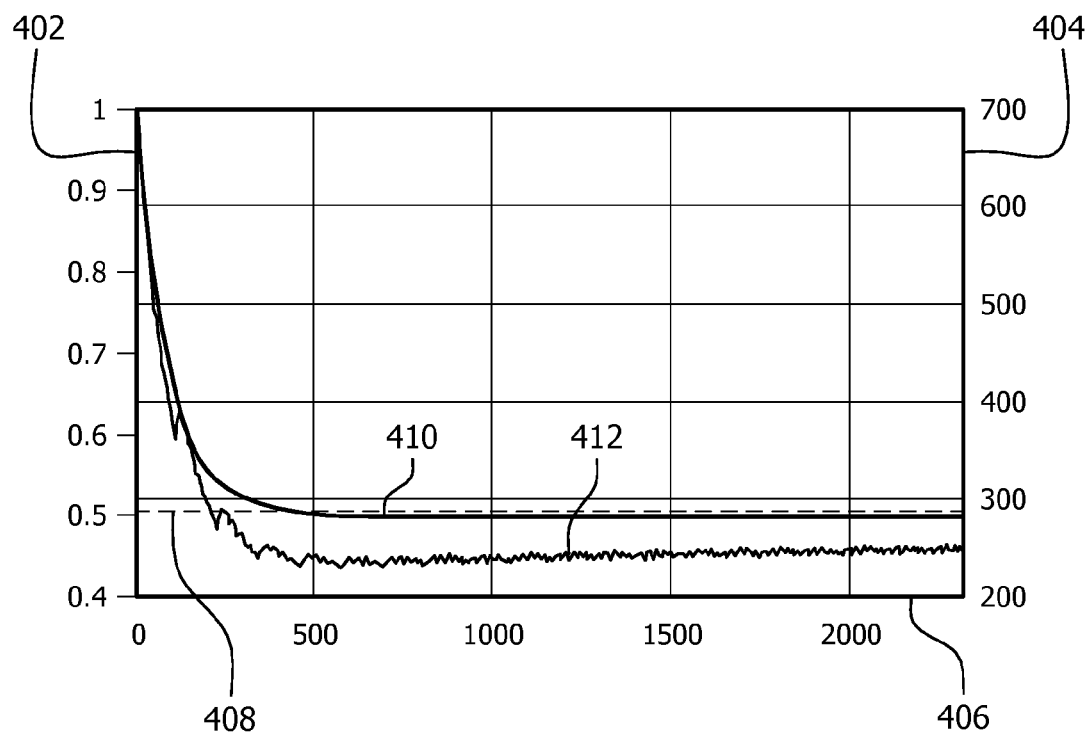

FIG. 4 graphically illustrates convergence of an automatically determined regularization factor to a value corresponding to a predetermined quality metric.

Figure 5:
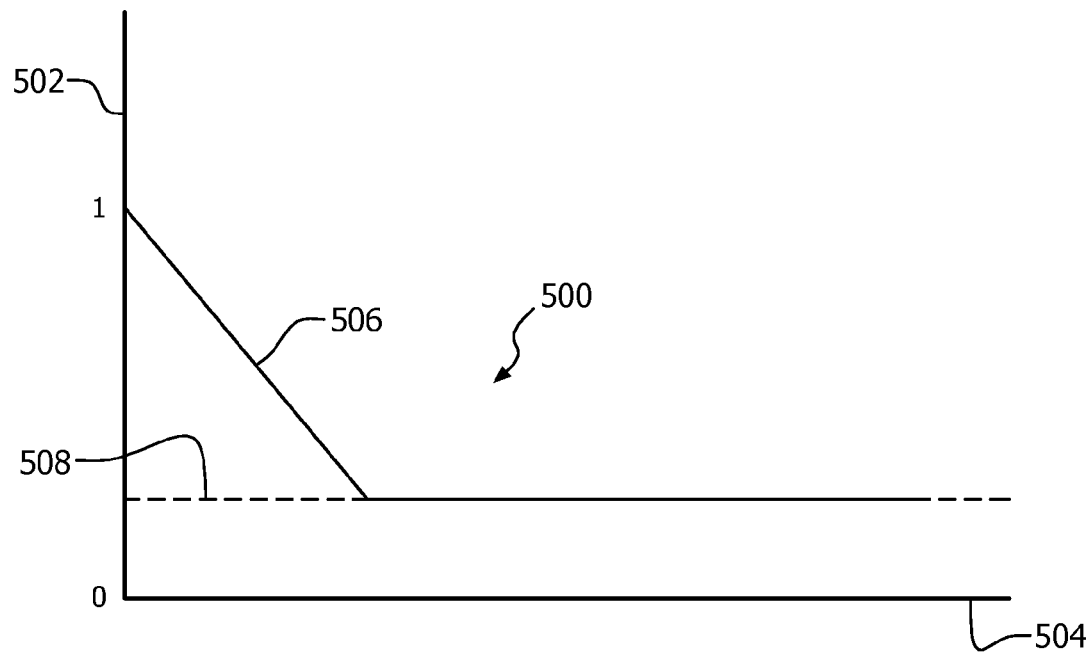

FIG. 5 graphically illustrates a desired behavior for the convergence of the predetermined quality metric.

Figure 6:
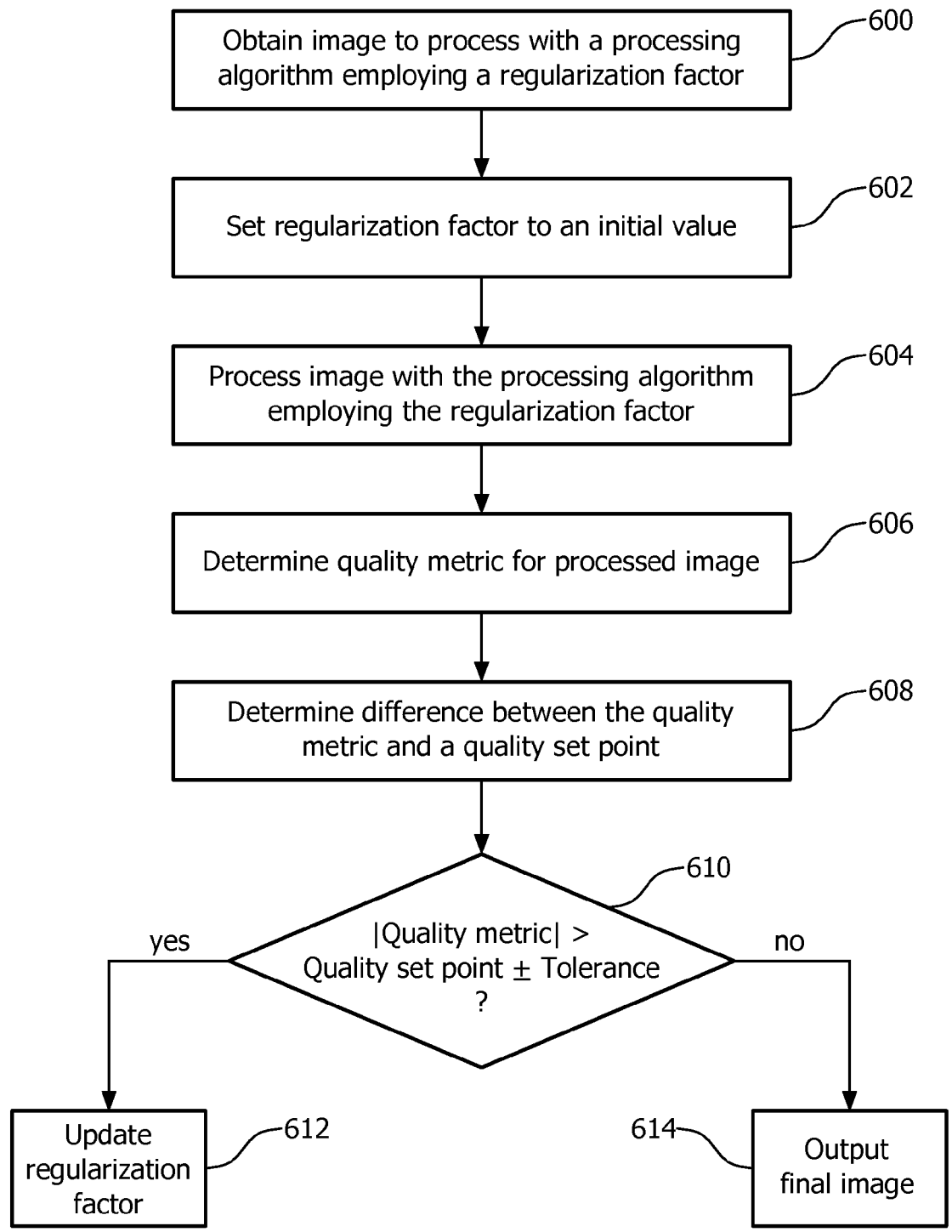

FIG. 6 illustrates an example method in accordance with at least one of FIG. 2 or 3.

The following generally relates to iterative reconstruction with regularization and/or image de-noising. As described in greater detail below, with the approach described herein, the regularization factor $\beta$ is automatically determined and the user only has to provide a relative level of regularization (e.g., between 0% (i.e., no regularization, or unregularized) and 100% (i.e., full regularization)), even though the regularization factor $\beta$ may vary from image to image and/or data set to data set. In one instance, this mitigates manual determination of a suitable regularization factor β through trial and error each image and/or data set by a user and thus reduces the amount of time to reach a suitable regularization factor β and final image.

FIG. 1 illustrates an example imaging system 100, such as a computed tomography (CT) scanner. The imaging system 100 includes a generally stationary gantry 102 and a rotating gantry 104, which is rotatably supported by the stationary gantry 102 and rotates around an examination region 106 about a z-axis.

A radiation source 110, such as an x-ray tube, is rotatably supported by the rotating gantry 104. The radiation source 110 rotates with the rotating gantry 104 and emits radiation that traverses the examination region 106. A one or two dimensional radiation sensitive detector array 112 subtends an angular arc opposite the radiation source 110 across the examination region 106. The detector array 112 detects radiation traversing the examination region 106 and generates projection data indicative thereof.

A subject support 118, such as a couch, supports an object or subject such as a human or animal subject in the examination region 106. A general-purpose computing system or computer serves as an operator console 120. The console 120 includes a human readable output device such as a monitor and an input device such as a keyboard, mouse, etc. Software resident on the console 120 allows the operator to interact with and/or operate the scanner 100 via a graphical user interface (GUI) or otherwise.

A reconstructor 114 reconstructs the projection data and generates image data indicative thereof. As described in greater detail below, in one instance, the reconstructor 114 employs an iterative reconstruction algorithm with regularization and determines the regularization factor β for each iteration based on an image quality metric of the image generated for the current iteration and a predetermined regularization level of interest, which can be a default and/or user defined level. In one instance, the regularization factor is determined automatically.

An optional image de-noiser 116 de-noises images generated by the reconstructor 114 and/or other reconstructor, including a reconstructor employing a conventional filtered-backprojection reconstruction algorithm and/or other regularized or non-regularized based reconstruction algorithm. As described in greater detail below, in one instance, the de-noiser 116, likewise, automatically determines the regularization factor β for a subsequent iteration based on an image quality metric of the current generated image generated for the current iteration and a predetermined regularization level of interest, which can be a default and/or use define level.

The reconstructor 114 and the image de-noiser 116 may be part of the same component, for example, a processing component 122, as shown in FIG. 1, or separate and distinct components. It is to be appreciated that automatically determining the regularization factor β for either or both of the iterative reconstruction algorithm with regularization or the image de-noising may enhance usability of iterative reconstruction algorithms with regularization and/or image de-noising, as a user does not have to know an absolute value of β, but rather just provides a relative level of regularization.

The reconstructor 114 and/or the image de-noiser 116 are implemented via a processor (or microprocessor, controller, etc.) executing one or more computer readable instructions encoded or embedded on computer readable storage medium such as physical memory. Such a processor can be part of the console 120 and/or other computing device such as a dedicated computer, and/or other computing device. The processor can also execute at least one computer readable instructions carried by a carrier wave, a signal, or other non-computer readable storage medium such as a transitory medium.

FIG. 2 illustrates an example of the reconstructor 114.

An image updater 202 receives an initial image and processes the image using an iterative reconstruction algorithm with regularization 204. An example of such an algorithm is described in Fessler, "Statistical image reconstruction methods for transmission tomography," Handbook of Medical Imaging, Volume 2: Medical Image Processing and Analysis, pages 1.70, SPIE, Bellingham, 2000. For example, this reference discusses an approach for determining an estimate $\hat{\mu}$ of the true attenuation map by maximizing a penalized-likelihood object function of the following form:

$$\hat{\mu} \triangleq \underset{\mu \geq 0}{\operatorname{argmax}} \Phi(\mu),$$

where $\Phi(\mu) \triangleq L(\mu) - \beta \cdot R(\mu)$, $\Phi$ is the objective function, and $R(\mu)$ is a roughness penalty.

In the illustrated embodiment, the regularization factor, for the first reconstruction iteration, is set to an initial value of β 206, which can be a predetermined default value and/or user defined, and can be a zero or a non-zero value. After such processing, the image updater 202 generates an image and likewise processes the generated image during a subsequent reconstruction iteration. In the illustrated example, the image updater 202 iteratively reconstructs a final image using a different updated value of β each reconstruction iteration.

An analyzer 208 receives the generated image after each reconstruction iteration and analyzes the received image based on one or more given quality criteria such as noise, artifacts, etc. The analyzer 208 generates a quality metric indicative thereof. The quality metric can be a single value or multiple values. Examples of quality metrics include, but are not limited to, a global or a local image noise standard deviation or variance. Other quantitative criteria may optionally be used. The analyzer 208 outputs the quality metric after each reconstruction iteration.

A β determiner 212 receives the quality metric of each generated image after each reconstruction iteration and determines the updated β for each next reconstruction iteration. The β determiner 212 includes a comparator 214 which compares the received quality metric of each reconstruction iteration with a predetermined quality set point 216 stored in memory 218, determining a value indicative of an error or difference between the received quality metric and the predetermined quality set point 216 each reconstruction iteration.

If the quality metric satisfies the quality set point 216 (e.g., the quality metric is within a predetermined range or tolerance about the set point 216), the β determiner 212 conveys a signal to the image updater 202, which terminates the iterative reconstruction, and the image updater 202 outputs a final reconstructed image. Other stopping criteria may include the number of iterations, lapse a time duration, etc. Otherwise, a β updater 220 updates a current value of β 222, and conveys the updated β to the image updater 202 for the next reconstruction iteration.

The set point 216 can be variously determined. For example, a set point determiner 224 determines the set point 216 based on lower and upper quality bounds 226 and a quality variable 228, which indicates a level between the lower and upper quality bounds 226. In one non-limiting instance, the upper bound is determined as the quality metric of the initial unregularized image, and the lower bound is determined as the quality metric of a fully (or 100%) regularized initial image, which can be determined by fully regularizing the image or approximated without fully regularizing the initial image. The lower and upper quality bounds 226 can be normalized by the upper bound. Other approaches for determining the lower and upper quality bounds 226 are also contemplated herein.

The quality variable 228, in this embodiment, represents a relative target level (e.g., expressed as a percentage or otherwise) between the lower and upper bounds 226 (e.g., 50% between the lower and upper bounds 226). This relative target level can be determined and set by a user (e.g., a radiologist or other practitioner) or computer.

FIG. 3 illustrates an example of the image de-noiser 116.

A de-noiser 302 receives an initial (e.g., a non-de-noised) image and de-noises the image based on a de-noising algorithm 304. The initial image can be generated by the imaging system 100 or other system. A non-limiting example of a suitable de-noising algorithm with regularization is described in international (PCT) application serial number PCT/IB2011/054588, entitled "Low Dose CT De-Noising," filed on Oct. 17, 2011, and assigned to Koninklijke Philips Electronics N V (Eindhoven, NL), the entirety of which is incorporated herein by reference.

The de-noiser 302 uses an initial value of β 306 with the de-noising algorithm 304 to de-noise the received initial image. The initial value of β 306 can be determined as described herein for the initial value of β 206. After such processing, the image de-noiser 302 generates a de-noised image. The de-noiser 302 may also further de-noise a generated de-noised image, if an image quality of the de-noised image does not satisfy an image quality of interest, as described below. In the illustrated example, the de-noiser 302 iteratively further de-noises the generated de-noised image using a different updated value of β each iteration.

The analyzer 208 and the β determiner 212 are as described in connection with FIG. 2.

That is, the analyzer 208 receives the generated image after each de-noising iteration and analyzes the received image based on one or more given quality criteria such as noise, artifacts, etc. The analyzer 208 generates a quality metric indicative thereof. The quality metric can be a single value or multiple values. Examples of quality metrics include, but are not limited to, a global or a local image noise standard deviation or variance. Other quantitative criteria may optionally be used. The analyzer 208 outputs the quality metric after each image de-noising iteration.

A β determiner 212 receives the quality metric of each generated image after each de-noising iteration and determines the updated β for each next de-noising iteration. The β determiner 212 includes a comparator 214 which compares the received quality metric of each de-noising iteration with a predetermined quality set point 216 stored in memory 218, determining a value indicative of an error or difference between the received quality metric and the predetermined quality set point 216 each de-noising iteration.

Similarly, if the quality metric satisfies the quality set point 216 (e.g., the quality metric is within a predetermined range or tolerance about the set point 216), the β determiner 212 conveys a signal to the image de-noiser 302, which terminates de-noising, and the image de-noiser 302 outputs a final de-noised image. Likewise, other stopping criteria may include the number of iterations, lapse of a time duration, etc. Otherwise, a β updater 220 updates a current value of β 222, and conveys the updated β to the image de-noiser 302 for the next image de-noising iteration.

In this example, the upper bound is determined as the quality metric of the initial (non-de-noised) image, and the lower bound is determined as the quality metric of a fully (100%) de-noised initial image, which can be determined by fully de-noising the image or approximated without fully de-noise the initial image. Likewise, the lower and upper quality bounds 226 can be normalized by the upper bound. Other approaches for determining the lower and upper quality bounds 226 are also contemplated herein.

In addition, the quality variable 228 can be set based on dose, which allows for dose reduction of the image for a given image quality. For example, where the practitioner is going to set the quality variable 228 at 50%, patient dose can be reduced four times for a given image quality, as the relationship between dose and noise can be determined. In another instance, the final image quality can be improved for a given patient dose. In yet another example, both image quality can be improved and dose can be reduced. Other approaches for determining the set point 216 are also contemplated herein.

A non-limiting approach for updating β each iteration, for either or both of the embodiments described in FIGS. 2 and 3, based on the quality set point 216 using proportional-integral-derivative (PID) control is shown in EQUATION 1:

$$\beta(k)=\beta(k-1)\cdot 2^{P(e(k)+IE(k)+D\Delta e(k))},\quad\quad\text{EQUATION 1:}$$

where β(k) is the updated β for the next iteration, β(k−1) is the previous updated β, P, I and D respectively are proportionality, integrating and derivative constants for PID control, e(k) represents the difference between the quality metric of the current iteration and the set point of the current iteration, E(k) is the summation of e(k) up to the k-th iteration, and Δe(k) represents the change (i.e., e(k)−e(k−1)) of the difference between the quality metric and the set point between the (k−1)-th to the k-th iteration. In another embodiment, β can be updated using P, PI, and/or other control.

FIG. 4 graphically illustrates a non-limiting example of updating β over multiple iterations using a maximum likelihood reconstruction with a Huber penalty where the quality metric is the global noise level of the image.

A first y-axis 402 represents the quality metric range between the lower and the upper bounds 226, normalized to the upper bound, a second y-axis 404 represents the value of β, and an x-axis 406 represents the number of reconstruction or de-noising iterations. For FIG. 4, a quality set point 408 is set to 50% between normalized upper and lower bounds (or 0.5). A quality metric curve 410 shows that the quality metric converges to the 50% point after approximately 500 iterations. A β curve 412 shows the value of β converges to and remains fairly constant at approximately 250 once the quality metric reaches the set point. This example is provided for explanatory purposes and is not limiting.

It is to be appreciated that the β updater 220 can optionally apply a set of updating rules for example, to mitigate under and/or overshoot of the quality metric. For example, FIG. 5 graphically illustrates an example target behavior 500 for the quality metric. In FIG. 5, a y-axis 502 represents the quality range between the lower and the upper bounds 226, normalized to the upper bound, and an x-axis 504 represents the number of reconstruction or de-noising iterations. As shown in FIG. 5, the target behavior 500 includes an approximately linear region 506 (i.e., a linear decay with a fixed slope) until a set point 508 is reached to mitigate possible overshoot of the set point 216. Other target behavior is also contemplated herein. This example behavior is provided for explanatory purposes and is not limiting.

FIG. 6 illustrates an example method in accordance with the embodiments described herein.

It is to be appreciated that the ordering of the acts in the methods described herein is not limiting. As such, other orderings are contemplated herein. In addition, one or more acts may be omitted and/or one or more additional acts may be included.

At 600, an image is obtained for processing with an algorithm employing a regularization factor.

At 602, the regularization factor is set to an initial value.

At 604, the image is processed, for example, as described herein via an iterative reconstruction algorithm with regularization or a de-noising algorithm, producing a processed image.

At 606, a quality metric is determined for the processed image.

At 608, the quality metric is compared with a quality set point and a difference value indicative of a difference between the quality metric and the quality set point is determined.

At 610, it is determined whether an absolute value of the quality metric is within a predetermined range (e.g., ±a tolerance) about the quality set point. As described herein, the quality set point can be determined based on target level between a lower quality bound and an upper quality bound 226.

If the quality metric is outside of the predetermined range, then at 612, the regularization factor is updated as described herein and acts 604-610 are repeated with the updated regularization factor. If the quality metric is within the predetermined range, then at 614, a final image is output.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A processing component that processes images based on an iterative reconstruction algorithm with regularization and/or de-noising algorithm, the processing component comprising:
    a set point determiner that determines a quality set point between predetermined lower and upper quality bounds based on a quality variable indicative of an image quality of interest;
    a comparator that compares, each processing iteration, a quality metric of a current generated image with the quality set point and generates a difference value indicative of a difference between the quality metric and the quality set point; and
    a regularization factor updater that generates an updated regularization factor for a next processing iteration based on a current value of the regularization factor and at least the quality metric in response to the difference value indicating that the quality metric is outside of a predetermined range about the quality set point.

2. The processing component of claim 1, wherein the quality variable defines a relative target level between the lower and upper bounds.

3. The processing component of claim 2, wherein the relative target level corresponds to a target image noise or artifact level reduction of interest.

4. The processing component of claim 1, wherein the upper bounds corresponds to a quality metric of the image before regularizing the image and the lower bounds corresponds to a quality metric of the image after fully regularizing the image.

5. The processing component of claim 1, wherein the lower bound is approximated without fully regularizing the image.

6. The processing component of claim 1, wherein the lower and the upper bounds are normalized by the upper bound.

7. The processing component of claim 1, wherein the regularization factor updater generates the updated regularization factor by one or more of multiplying the current value of the regularization factor by an update term, which is a function of the quality metric or by adding to the current regularization factor an update term, which is a function of the quality metric.

8. The processing component of claim 1, wherein the regularization factor updater generates the updated regularization factor based on proportional-integral-derivative control.

9. The processing component of claim 1, wherein the quality metric of an iteration is indicative of an image noise level of the generated image of that iteration.

10. The processing component of claim 1, wherein the quality metric of the iteration is indicative of a standard deviation of an image noise level of the generated image of that iteration.

11. The processing component of claim 1, wherein the quality metric of an iteration is indicative of an artifact level of the generated image of that iteration.

12. The processing component of claim 1, further comprising:
    a de-noiser that de-noises the image each iteration based on the updated regularization factor for the corresponding iteration.

13. The processing component of claim 1, further comprising:
    an image updater that updates the image each iteration based on the updated regularization factor for the corresponding iteration.

14. The processing component of claim 1, wherein the regularization factor updater generates the updated regularization factor based on a predetermined behavior of the quality metric.

15. A method, comprising:
    processing an initial image during a first processing iteration using an algorithm, which employs regularization, and an initial regularization factor, and generating a first image;
    determining a first quality metric of the first image;
    comparing the first quality metric of the first image with a quality set point and determining a difference value there between; and
    generating an updated regularization factor for a subsequent processing iteration of the image in response to the first quality metric being outside of a predetermined range about the quality set point,
    wherein the updated regularization factor is generated based on the initial regularization factor and the first quality metric, and the updated regularization factor is used to process the first image during the subsequent processing iteration and generate a subsequent image.

16. The method of claim 15, wherein the quality set point is based on a user defined target percentage between a lower quality bounds and an upper quality bounds.

17. The method of claim 16, wherein the lower bounds corresponds to a quality value of the image before regularization and the upper bounds corresponds to a quality value of the image after full regularization.

18. The method of claim 16, wherein the quality metric each iteration is indicative of an image noise level or an artifact level of the generated image each respective processing iteration.

19. The method of claim 15, further comprising:
generating an updated regularization factor each processing iteration until the first quality metric is within the predetermined range about the quality set point.

20. A processing component, comprising:
a component that processes an image using an iterative algorithm employing regularization and generates an image, wherein the iterative algorithm at least includes a regularization term multiplied by a regularization factor;
an analyzer that generates a quality metric after each processing iteration for a respective generated image; and
a regularization factor determiner that automatically generates an updated regularization factor for a next processing iteration by the component based on a quality metric of a generated image of a current processing iteration and a predetermined quality set point for the generated image.

\* \* \* \* \*